United States Patent
Haghighat et al.

(10) Patent No.: US 9,696,709 B2
(45) Date of Patent: Jul. 4, 2017

(54) METHOD AND SYSTEM FOR COMPUTING REFERENCE SIGNALS FOR MACHINES WITH REDUNDANT POSITIONING

(71) Applicant: Mitsubishi Electric Research Laboratories, Inc., Cambridge, MA (US)

(72) Inventors: Sohrab Haghighat, Cambridge, MA (US); Stefano Di Cairano, Somerville, MA (US); Scott A. Bortoff, Brookline, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 696 days.

(21) Appl. No.: 14/186,113

(22) Filed: Feb. 21, 2014

(65) Prior Publication Data

US 2015/0241865 A1    Aug. 27, 2015

(51) Int. Cl.
  *G06F 19/00*   (2011.01)
  *G05B 19/19*   (2006.01)

(52) U.S. Cl.
  CPC ......... *G05B 19/19* (2013.01); *G05B 19/195* (2013.01); *G05B 2219/41105* (2013.01); *G05B 2219/41194* (2013.01); *G05B 2219/42089* (2013.01); *G05B 2219/42219* (2013.01); *G05B 2219/45041* (2013.01); *G05B 2219/45139* (2013.01); *G05B 2219/50047* (2013.01)

(58) Field of Classification Search
  None
  See application file for complete search history.

(56) References Cited

U.S. PATENT DOCUMENTS

| | | | |
|---|---|---|---|
| 5,109,148 A | 4/1992 | Fujita et al. |
| 5,262,707 A | 11/1993 | Okazaki et al. |
| 5,452,275 A | 9/1995 | Ogawa |
| 5,751,585 A | 5/1998 | Cutler et al. |
| 5,798,927 A | 8/1998 | Cutler et al. |
| 5,801,939 A | 9/1998 | Okazaki |

(Continued)

FOREIGN PATENT DOCUMENTS

| CN | 101689049 A | 3/2010 |
|---|---|---|
| CN | 102629122 A | 8/2012 |

(Continued)

*Primary Examiner* — Evral E Bodden
(74) *Attorney, Agent, or Firm* — Gene Vinokur; James McAleenan; Hironori Tsukamoto

(57) ABSTRACT

A method computes reference signals for a machine with redundant positioning by first generating a reference trajectory according to an ordered list of points. Then, using a filter or by choosing the value of the reference at each sampling time, a reference trajectory for the slow subsystem is produced. Next, determine whether the reference trajectory and the slow subsystem reference trajectory violate feasibility constraints, and if true, slowing down the reference trajectory and repeating with the generation of the slow subsystem reference trajectory. The slow subsystem reference trajectory is sent, via a model predictive control block, to a slow positioning subsystem controller, and a combination of the slow subsystem reference trajectory and the reference trajectory is sent to a fast positioning subsystem controller.

22 Claims, 12 Drawing Sheets

(56) References Cited

U.S. PATENT DOCUMENTS

| | | | |
|---|---|---|---|
| 5,837,962 A | 11/1998 | Overbeck et al. | |
| 6,313,433 B1 | 11/2001 | Sukman et al. | |
| 6,496,292 B2 | 12/2002 | Fillion et al. | |
| 6,706,998 B2 | 3/2004 | Cutler | |
| 6,706,999 B1* | 3/2004 | Barrett | B23K 26/02 219/121.74 |
| 6,901,300 B2* | 5/2005 | Blevins | G05B 13/048 700/18 |
| 7,050,208 B2 | 5/2006 | Overbeck et al. | |
| 7,245,412 B2 | 7/2007 | Bruland et al. | |
| 7,315,038 B2 | 1/2008 | Bruland | |
| 7,710,060 B2* | 5/2010 | Cardinale | G05B 19/19 318/568.1 |
| 8,701,298 B2* | 4/2014 | Jordil | G01B 21/047 33/503 |
| 2013/0190898 A1 | 7/2013 | Shilpiekandula et al. | |
| 2013/0307459 A1* | 11/2013 | Tian | G05B 19/416 318/570 |

FOREIGN PATENT DOCUMENTS

| | | |
|---|---|---|
| EP | 594699 B1 | 12/1995 |
| WO | 2008148558 A1 | 12/2008 |

* cited by examiner

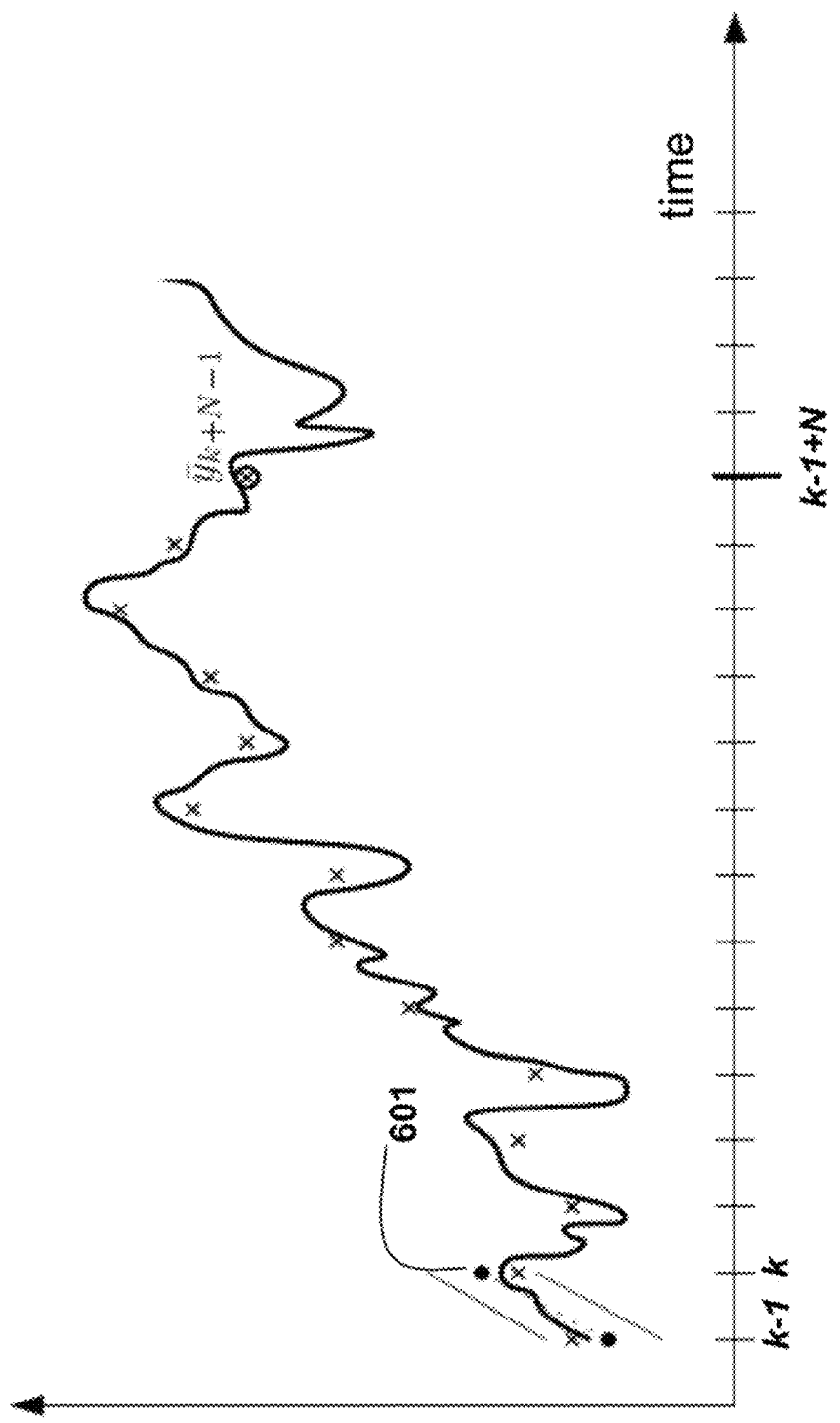

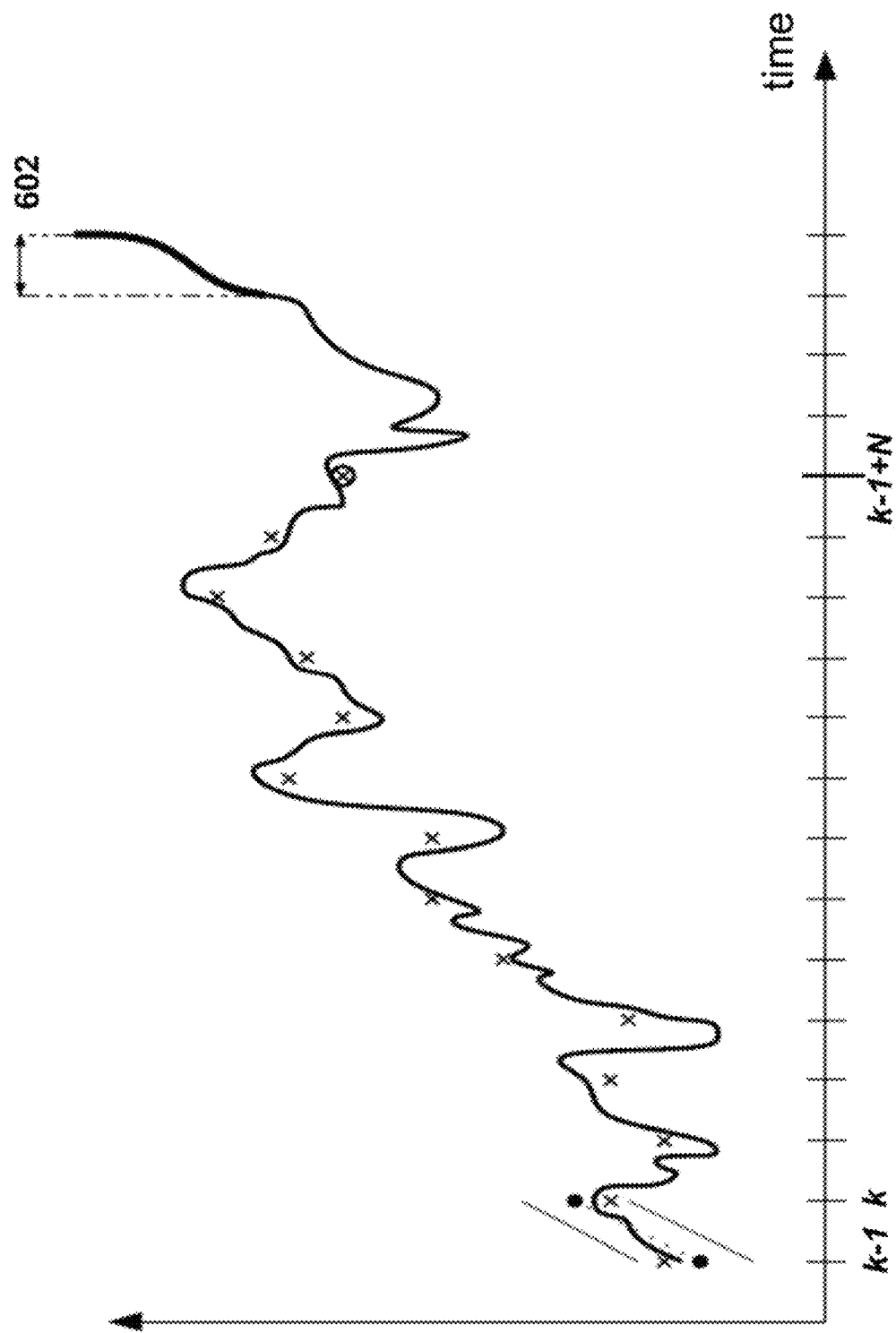

METHOD AND SYSTEM FOR COMPUTING REFERENCE SIGNALS FOR MACHINES WITH REDUNDANT POSITIONING

FIELD OF THE INVENTION

This invention relates generally to coordinated control of machines with redundant actuators for positioning, and more particularly to machines and subsystems that are subjected to physical and operational constraints.

BACKGROUND OF THE INVENTION

Positioning systems with redundant actuators are widely used in manufacturing and factory automation. In these machines, multiple actuators are available along each axis of motion such that the machine position state is a function (often a sum) of each individual actuator state. In some cases, the states of the entire system can be represented by a linear combination of individual positions of the positioning subsystems.

These machines also have constraints associated with the actuators such as stroke limits, velocity limits, and torque limits. These constraint must be satisfied during operation. Approaches to controlling redundant positioning machines with constraints range from simple ad hoc gain tuning methods to more rigorous mathematical methods, and have been used to compute trajectories that meet performance requirements and satisfy the constraints of the system.

A reference trajectory for the subsystems of a redundant positioning system must ensure that numerous constraints are satisfied. These constraints include, but are not limited to, the physical limitations of the positioning subsystems (such as a stroke constraint, which is the allowed range of motion of an actuator), and operational constraints, such as maximal operational velocities and accelerations of the machine and of each positioning subsystem.

Some prior art systems use a combination of limiter and dead-band elements to compute reference trajectories that do not violate stroke constraints. For example, U.S. Pat. No. 5,262,707 describes cooperative position control of a redundant system including a fine and a coarse movement mechanism. A general purpose positioning control method is used to control the coarse movement mechanism such that the fine subsystem movement does not exceed a range of motion of the subsystem. This is achieved by adjusting gains of the coarse movement subsystem. This is an ad hoc method that does not provide any guarantee that the constraints are satisfied for all the possible operating conditions of the machine.

U.S. Pat. Nos. 5,452,275 and 7,710,060 describe two-stage fast and slow actuator control systems. Frequency separation and filtering approaches in frequency and amplitude were adopted to compute trajectory for the fast and slow subsystems, but no constraints are considered.

U.S. Pat. No. 5,801,939 considers the issue of range saturations in a redundant positioning system with a coarse and a fine positioner. The fine positioner has a faster dynamics but is limited by its small stroke range. To address this problem, a model of the fine positioning subsystem along with a limiter is used in the control loop of the coarse subsystem.

U.S. Pat. Nos. 5,751,585 and 6,706,999 describe a triply redundant laser beam positioner system that uses a combination of fast steering mirrors and galvanometer driven mirrors along with an X-Y table. Low and mid pass filters are used to perform frequency separation. The low frequency component of trajectory is followed by the X-Y table, the low frequency positioning error is sent to a mid pass filter, the output of which is tracked by the galvano mirrors. The remainder high frequency components are then sent to a controller for a fast steering mirror. To mitigate the effect of phase shift introduced by the filters, two delay elements are utilized. The introduction of the delay elements increases the system throughput by decreasing the travel time between points. Again, the constraints of the system are not considered.

In U.S. Application Publication 20130190898, model predictive control is used to compute trajectories for different stages of the machine while explicitly enforcing physical and operational constraints. The proposed approach uses a terminal state constraint and relies on the availability of a feasible trajectory. However, in the absence of such feasible trajectory the control system may fail to compute a trajectory that satisfies all of the constraints.

None of the conventional methods for the control of redundant positioning systems have managed to address the problem of computing reference trajectories that guarantee constraint satisfaction. Manual tuning controller gains or filter crossover frequencies has been used to address the constraint problem without rigorous guarantees. But this is undesirable because the system performance, e.g., throughput, is dependent on these gains and filter frequencies. To avoid constraints, the performance of the machine is reduced. Furthermore, regardless of the gain magnitudes and the filter frequencies, constraint satisfaction is not guaranteed for all the different desired motion of the machine. In addition, tuning the filter gains, the delay elements, the limiters, and the dead-band elements is a task for which no systematic procedure is available, and hence can be time consuming, error prone, and may result in the reduced machine performance, in terms of throughput and precision.

SUMMARY OF THE INVENTION

The embodiments of the invention provide a reference trajectory generator for positioning a machine with redundant actuators. The generator guarantees that machine constraints are satisfied. In some embodiments, the system can be a redundant laser drilling system.

In this context, a reference trajectory represents a path in space parameterized by time, which the controlled parameter of the system, e.g., the laser spot coordinates, has to follow to within an error tolerance. Following this definition, a feasible reference trajectory is a reference trajectory that the machine can follow within an error tolerance, such that all system constraints are satisfied.

It is also desirable that the laser spot follows the path with a highest possible velocity along the path. This increases the throughput of the machine. In addition, it is desirable that the positioning subsystems be provided with reference trajectories that are as smooth as possible so as to avoid undesirable vibrations of the mechanical components. Smoothness means that the reference trajectories have a minimal jerk, which is the third derivative of the position with respect to time.

The overall laser drilling system which is the subject of this invention includes the reference trajectory generator and two positioning subsystems. A fast positioning subsystem includes a fast-axis controller and a galvano mirror assembly to direct a laser spot at different locations on a workpiece. A slow positioning subsystem uses a slow-axis controller and an X-Y table to locate a galvano mirror (optical assembly) relative to a workpiece.

Two setups are typically possible. In the case of "flying optics," the workpiece is stationary on the X-Y table, and the optical assembly moves with the X-Y table. In the other case, the optical assembly (other than the mirror itself) is stationary, and the table moves. The embodiments can be worked with either configuration.

The fast positioning subsystem can move with high velocities and accelerations and has a higher bandwidth than the slow positioning subsystem, but is limited by a relatively short stroke, i.e., operating range. In contrast, the slow positioning subsystem has a relatively larger stroke, compared to the fast positioning subsystem, and can cover a larger area, but it has a lower bandwidth and its accelerations and velocities are smaller than the fast positioning subsystem, e.g. the velocity by about one order of magnitude, and the acceleration by at least three orders.

The significant difference between the operation rates of the two positioning subsystems makes it possible to control these subsystems separately. However, the presence of the stroke limitation for the fast positioning subsystem and the velocity and acceleration constraints for the slow positioning subsystem does not allow for the complete separation of these subsystems. The presence of the abovementioned system limitations and coupling between these subsystems make the problem of trajectory generation for the fast and slow positioning subsystems challenging.

Some embodiments of this invention are based on the realized characteristics of a feasible reference trajectory for a positioning system with redundant actuators. Based on these realized properties, the method generates a reference trajectory for the slow positioning subsystem, and a trajectory for the laser spot, which is a function of the reference trajectory and the slow subsystem reference trajectory. In most cases the relation between the laser spot position and the reference trajectories can be approximated as a linear combination (addition or subtraction).

The reference generator for redundant positioning system is designed with the systems constraints in mind and guarantees that constraints are satisfied. The method guarantees that the reference trajectory can be tracked within the prespecified bounds (fast subsystem stroke) such that all machine operating constraints (velocity, accelerations, torques, etc.) are satisfied. In the preferred embodiment, the method uses an averaging method, such as a low-pass filter, to generate a reference trajectory for the slow positioning subsystem. In the absence of a filter, the values of the reference trajectory at each time step are chosen as the slow subsystem reference trajectory.

In the preferred embodiment, a zero-phase low-pass filter is employed. This results in a zero phase difference between the reference trajectory and the reference trajectory for the slow positioning subsystem. The method automatically slows down the reference trajectory such that all constraints are satisfied. This guarantees that the laser spot is always within the range of motion of the fast positioning subsystem, while other constraints and limitations are satisfied.

BRIEF DESCRIPTION OF THE DRAWINGS

FIG. 6A is a schematic of the reference trajectory according to embodiments of the invention;

FIG. 6B is a schematic of adding a new portion to the reference trajectory according to embodiments of the invention;

DETAILED DESCRIPTION OF THE PREFERRED EMBODIMENTS

Figure 1:
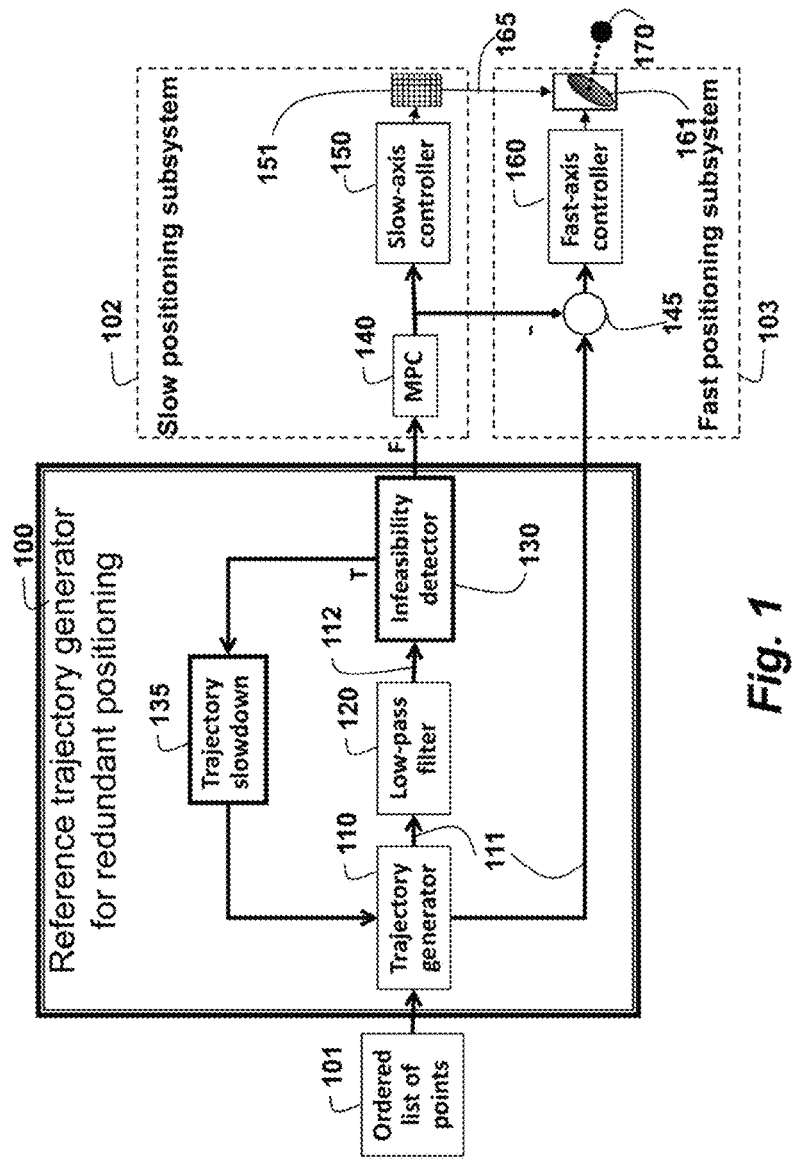
FIG. 1 is a block diagram of a reference generator for a redundant positioning system according to embodiments of the invention.

As shown schematically in FIG. 1, the embodiments of the invention provide a system and method 100 for generating reference trajectories for positioning machines with redundant actuators, e.g., a laser drilling system. It is understood that the invention can be applied too other types of positioning systems with redundant actuators.

In particular, we have described embodiments using a redundant laser drilling system, but the invention has the same effect for a processing machine such as a redundant laser cutting system, a redundant laser marking system, a redundant scribing system, a redundant laser direct imaging system or a redundant electron beam processing machine.

The overall system includes the reference trajectory generator 100, a slow positioning subsystem 102 and a fast positioning subsystem 103. Depending on components selected, such as linear actuators and galvano mirror assemblies, the velocity of the fast positioning system is about one order of magnitude faster than the slow positioning subsystem, and the acceleration is at least three orders faster.

The reference signal trajectory generator 100 includes trajectory generator 110, an optional filter 120, an infeasibility detector 130 for determining feasibility violations, which are all serially connected. A trajectory slowdown block 135 provides feedback to the trajectory generator. The filter can be, for example, a low pass zero-phase finite impulse response (FIR) filter, or a low pass zero-phase infinite impulse response (IIR) filter, or a low pass IIR filter. The infeasibility detector 130 can be implemented in hardware or a processor.

The slow positioning subsystem 102 includes a model predictive control (MPC) module 140, a slow-axis control 150, and an X-Y table 151. Typically, the workpiece is mounted on the table. The fast subsystem includes a fast-axis controller 161 and galvano mirror assembly 161. In combination, the slow and fast subsystems position a laser spot relative to the workpiece on the table. In a system with "flying optics", besides the mirror moving, the optical assembly is moved on the X-Y table, while the workpiece is stationary. In yet an alternative embodiment, the optical assembly (other than the mirror itself) is stationary, and the X-Y table and the workpiece are moved. The embodiments can be worked with either configuration.

Figure 3A:
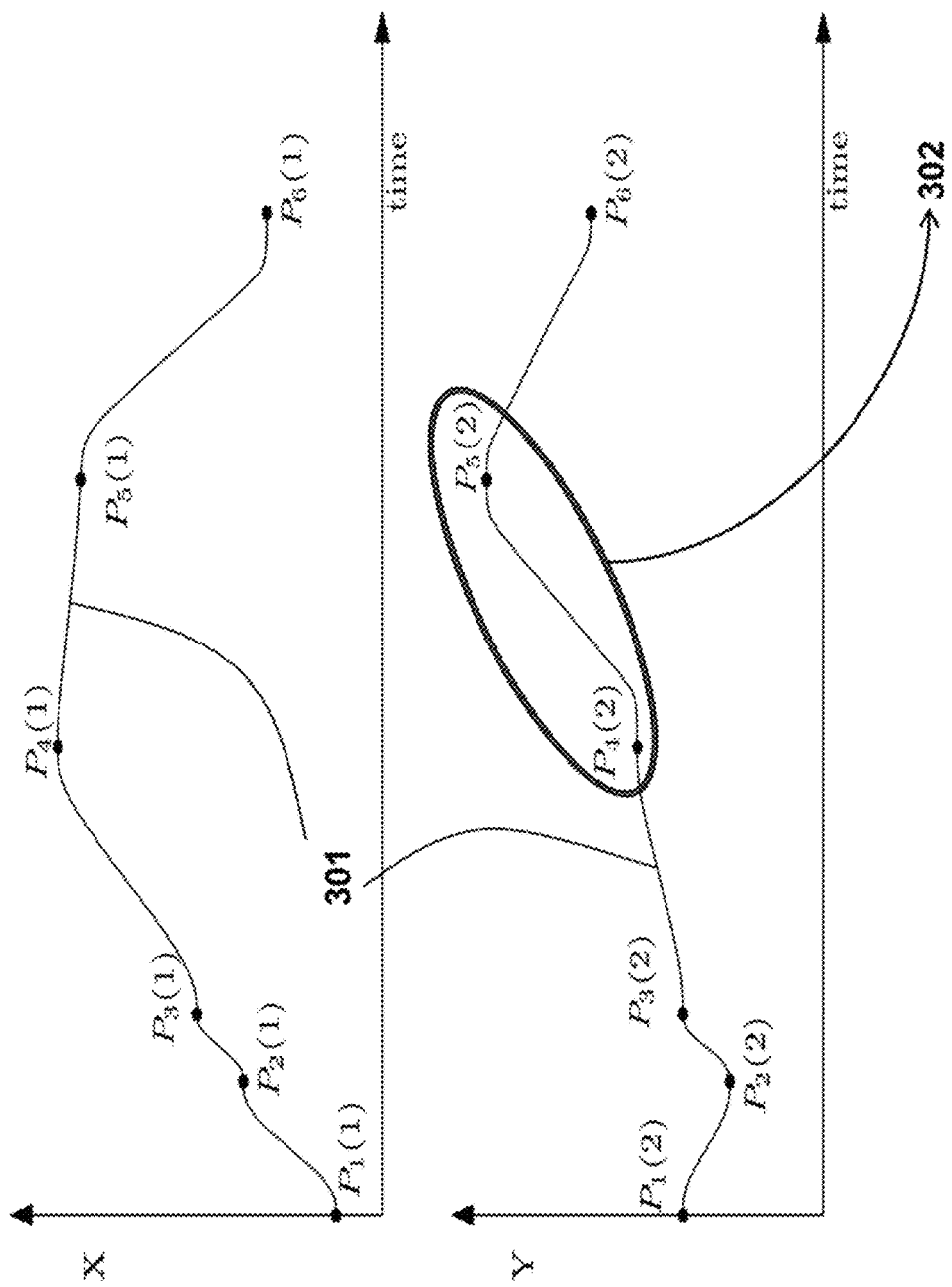
FIG. 3A is a time history of a trajectory for laser spot according to embodiments of the invention.
Figure 3B:
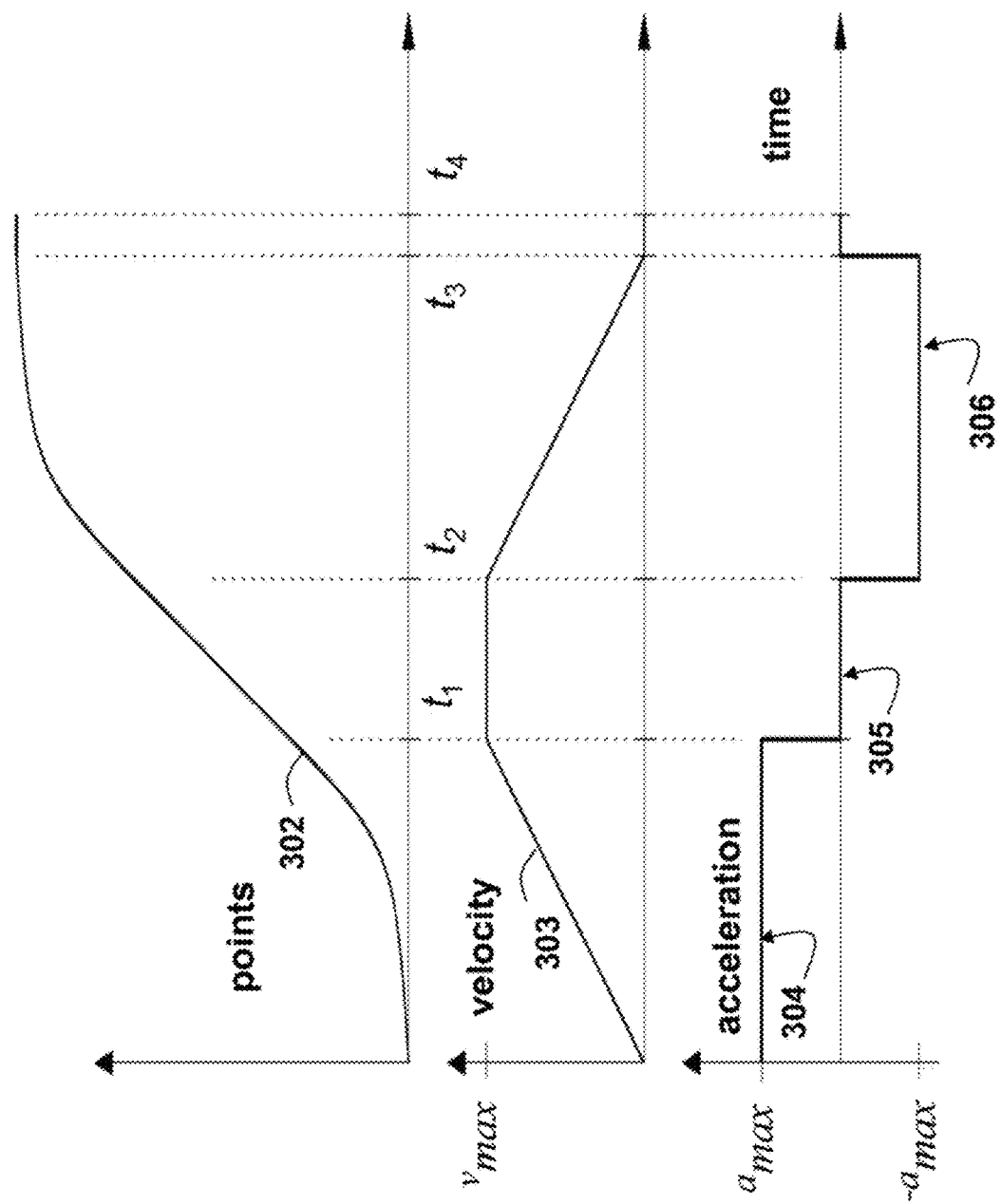
FIG. 3B is a time history for velocity and acceleration for a portion of the trajectory shown in FIG. 3A time according to embodiments of the invention.

Operationally, the system receives an ordered list of points 101 as input, $(X_k, Y_k)$ for k=1, 2, . . . , N, for the laser spot 170 on the workpiece. This list can be stored as in a non-volatile memory. The trajectory generator 110 takes this list as input and generates a reference trajectory 111 as output. The reference trajectory 111 is a function of time for the X and Y coordinates of the points between each of the successive elements of the ordered list 101. The reference trajectory 111 for the X-axis and Y-axis is generated as shown in FIG. 3A, A velocity profile 303 for a portion 302 of the trajectory is shown in FIG. 3B.

The optional filter 120 takes the reference trajectory 111 and produces a filtered reference trajectory 112 for the slow positioning subsystem 102. Alternatively, one can choose a value of the reference trajectory to generate a slow subsystem reference trajectory 113.

The infeasibility detector 130 checks the feasibility of the filtered reference trajectory or the slow subsystem reference trajectory. If there is a possibility of a constraint violation, then the trajectory slowdown block 135 slows down the reference trajectory 111 by reducing its maximal acceleration and maximal velocity and feeds the reduced maximal acceleration and velocity back to the trajectory generator 110 to regenerate the reference trajectory 111. This process repeats until a feasible filtered reference trajectory or a feasible slow subsystem reference trajectory results so that the machine can operate such that the constraints are satisfied.

After a feasible filtered reference trajectory 112 or slow subsystem reference trajectory 113 for the slow positioning subsystem is generated, the filtered reference trajectory or the slow subsystem reference trajectory 113 is fed to the model predictive control (MPC) module 140. The MPC is a control approach that solves a receding horizon optimal control problem. It has the capability to directly enforce system constraints. It also has the capability to generate a smooth trajectory to avoid mechanical vibrations. The MPC 140 output is sent to the slow-axis controller 150 to position the X-Y table (or galvano mirror assembly) relative to the workpiece, by either moving the table or the galvano mirror assembly, depending on the configuration of the machine.

In the fast positioning subsystem, the MPC output is also subtracted 145 from the reference trajectory 111 and sent to the fast-axis controller 160 for the galvano mirror 161. In this way the entire machine trajectory, i.e., the laser spot 170, is a function of the fast positioning subsystem and the slow positioning subsystem trajectories e.g., $$x_{laser\ spot} = f_x(x_{fast}, x_{slow})$$

$$y_{laser\ spot} = f_y(y_{fast}, y_{slow})$$

In some embodiments, the relationship between the laser spot position and the positions of the fast and slow positioning subsystems can be approximated using a linear function.

The method and system can be performed in a processor connected to memory and input/output interfaces by busses as known in the art. The method can be run in real time.

Of particular interest are the infeasibility detector 130, and the trajectory slowdown 135 blocks. The combination of these two blocks guarantees that a feasible filtered reference trajectory for the slow positioning subsystem (or slow subsystem reference trajectory) is passed to MPC block 140. This means that the machine is operated such that the reference trajectory is always within the range of motion of the fast positioning subsystem, and other constraints and limitations are satisfied.

Figure 2:
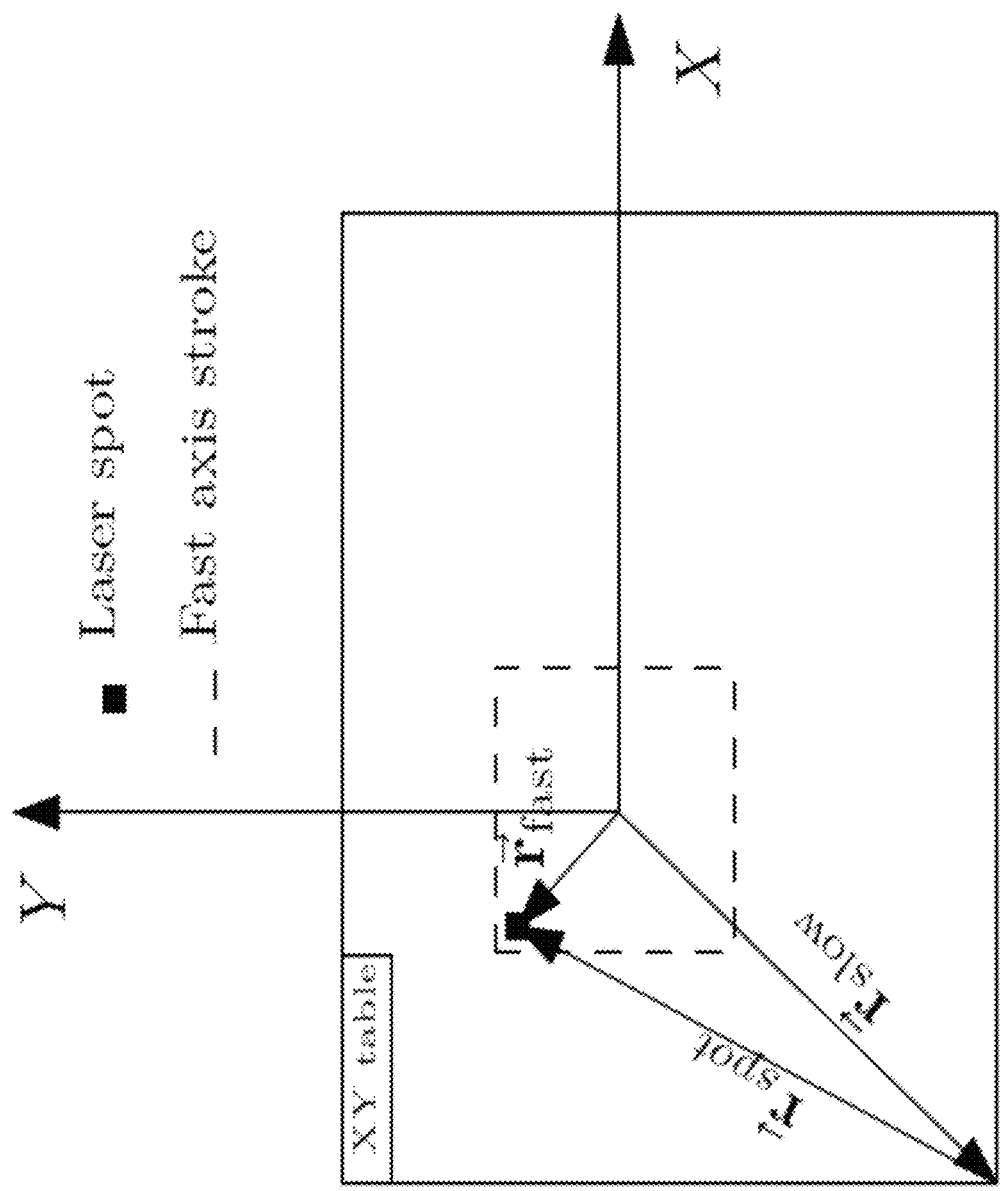
FIG. 2 is a schematic of a linear relationship of the position vectors for fast and slow positioning subsystems to reach the laser spot according to embodiments of the invention.

As shown in FIG. 2, the reference trajectory 111 is approximated as a linear combination of the vectors $\vec{r}$ for fast and slow positioning subsystems.

As shown in FIG. 3A, and assuming an ordered list of points 101 for the laser spot on the workpiece, a portion 301 of the reference trajectory 111 in FIG. 1, or 601 in FIG. 6A is a function of time for the X and Y axis and is constructed by connecting together a series of sub-trajectories 302 between two consecutive X-Y elements, $(p_n(1)$ and $p_n(2))$, of the ordered list 101. The subscript indexes the points, and the numbers in bracket are 1 and 2 for the x and y coordinates, respectively.

As shown in FIG. 3B, a trapezoidal velocity profile 303 is used to generate sub-trajectories 302 between the two consecutive points.

During acceleration phase 304 of the sub-trajectory the maximal acceleration is applied, while during the coasting period 305 the acceleration is set to zero. The maximal deceleration rate is then used during the deceleration period 306 until the laser spot reaches the target position with a zero velocity. At the end of the sub-trajectory 302, when the laser spot reaches the target position, the laser spot stops for a dwell time, e.g., to drill a hole in the workpiece.

The distance between the two consecutive positions of the ordered list of positions 101 determines whether or not the maximal velocity limit is reached on the way to the target position. To compute the times $t_1$ to $t_4$, the shortest distance at which the maximal velocity is reached is computed according to $$\text{pitch} = \frac{v_{max}^2}{a_{max}}. \tag{1}$$

Depending on the pitch and the distance between the two consecutive positions of the ordered list of positions 101, the time indices $t_1$ to $t_4$ can be computed according to the following set of equations (2)

$$\begin{cases} t_1 = t_2 = \sqrt{\frac{distance}{a_{max}}} & distance \leq pitch \\ t_3 = 2\sqrt{\frac{distance}{a_{max}}} \\ t_4 = t_3 + t_{dwell} \\ t_1 = \frac{v_{max}}{a_{max}} & distance > pitch \\ t_2 = t_1 + \left(\frac{distance}{v_{max}} - \frac{v_{max}}{a_{max}}\right) \\ t_3 = t_2 + t_1 \\ t_4 = t_3 + t_{dwell} \end{cases}$$

For distances shorter than the pitch, the velocity profile has a triangular shape. Although, the X and Y actuators are not dynamically coupled, the fact that both coordinates coincide with the target position at the same time links the two coordinates. As a result, the distance used for the times $t_1$ to $t_4$ is computed as $$\text{distance} = \max\{|P_{i+1}(1)-P_i(1)|, |P_{i+1}(2)-P_i(2)|\}, \quad (3)$$

where $P_i$ and $P_{i+1}$ represent the positions of two consecutive points from the ordered list of positions 101. The described trajectory generator 110 is designed for a laser drilling machine. In a laser cutting machine where the laser is always on, a different velocity profile may be used. Most significantly, the dwell time will be set to zero. The other blocks described hereafter will remain unchanged.

We realize that in order to use the MPC 140 in the redundant laser drilling machine, the filtered reference trajectory 112 (or slow subsystem reference trajectory 113) and the reference trajectory 111 have to satisfy specific requirements as a result. When the filtered reference trajectory 112 (or slow subsystem reference trajectory 113) does not satisfy these specific requirements, the MPC 140 may fail to enforce all system constraints. This may cause the required position of the laser spot to fall outside of the stroke range of the fast positioning subsystem, resulting in tracking errors for the laser spot. We further realize that the feasibility of filtered reference trajectory 112 (and slow subsystem reference trajectory 113) can be verified by checking two main specifications; a recursive feasibility constraint, and a persistent tracking constraint, as described below in greater detail.

To perform the task of checking the recursive feasibility constraint and the persistent tracking constraint, we start from an initial feasible portion of the filtered reference trajectory 112 (or slow subsystem reference trajectory 113). Based on this, we have to maintain the feasibility of the filtered reference trajectory (or slow subsystem reference trajectory) when the trajectory generator goes through a new cycle, that is, when a next portion of reference trajectory 111 needs to be generated.

Given the predictive nature of the MPC 140, the filtered reference trajectory for the slow positioning subsystem (or slow subsystem reference trajectory) is generated for N steps in the future, i.e., the control horizon. As a result, when the system is at time step $k-1$ the filtered trajectory or slow subsystem reference trajectory for the slow positioning subsystem has already been generated until the time step $k+N-1$. Therefore, feasibility of the filtered trajectory or slow subsystem reference trajectory for the slow positioning subsystem has to be evaluated for the period $k+N-1$ to $k+N$.

Recursive Feasibility

In what follows, system input refers to the command that is applied to the slow positioning subsystem of the machine and the system output is the resulting slow positioning subsystem position. Two types of embodiments are considered for this invention. In one embodiment, the command is the torque applied to the slow positioning subsystem. In the other embodiment, the command is the reference trajectory for the slow positioning subsystem. These different embodiments are described below.

The term "state" refers to the smallest subset of time varying quantities such as positions and velocities of the machine such that by knowing the state at a certain time instant and the input into the positioning subsystem for an interval of time T into the future, the future behavior of the machine is known for that interval of time T.

In some embodiments of this invention, the state variables are the position and velocity of the slow positioning subsystem, and the input is the torque applied to the slow positioning subsystem. Such embodiments can be represented by the following equation.

$$J\ddot{y} + b\dot{y} = ku, \quad (4)$$

where y is the generalized position of the slow positioning subsystem (usually either a linear position or a rotational position), J is the generalized inertia of the system, b is the damping, and k is the torque constant. In this equation, u is the applied torque. This system can be expressed in the following form, $$\dot{x} = Ax + Bu \text{ where } x = \begin{bmatrix} \text{position} \\ \text{velocity} \end{bmatrix} \text{ and } u = \text{torque}. \quad (5)$$

In other embodiments, the input represents the desired slow positioning subsystem position, i.e., the reference trajectory for a servo controller actuating the slow positioning subsystem, and the states are the position and its derivatives up to $(n-1)^{th}$ order.

$$a_n \frac{d^n y}{dt^n} + \ldots + a_1 \dot{y} + a_0 y = u, \quad (6)$$

where y is again the generalized position of the slow positioning subsystem and u is the reference position of the slow positioning subsystem. Similarly, this system can be represented as $$\dot{x} = Ax + Bu \quad (7)$$

where $$x = \begin{bmatrix} y & \dot{y} & \ldots & \frac{d^{n-1}y}{dt^{n-1}} \end{bmatrix}^T$$

and u=reference position.

In equations (4) and (7), matrices A and B are the state and control matrices of appropriate dimensions.

The recursive feasibility is commonly guaranteed by using a terminal equality constraint in applications of MPC where the reference trajectory is a constant value of time. However, the terminal equality constraint does not by itself guarantee the recursive feasibility of MPC, when the reference trajectory is time-varying.

We realize that in order to maintain the recursive feasibility, in addition to the terminal equality constraint implemented in MPC 140, the reference trajectory for the slow positioning subsystem needs to satisfy the following "forward reachability" test:

$$\bar{x}_{k+N} \in \text{Reach}(\bar{x}_{k+N-1}) \quad (8)$$

where $\bar{x}_{k+N}$ is the vector of the filtered reference trajectory for the slow positioning subsystem (or slow subsystem reference trajectory) (position and velocity) at the time step $k+N$, and $\text{Reach}(\bar{x}_{k+N-1})$ represents all feasible states that can be reached within one time step using an admissible control.

Figure 4:
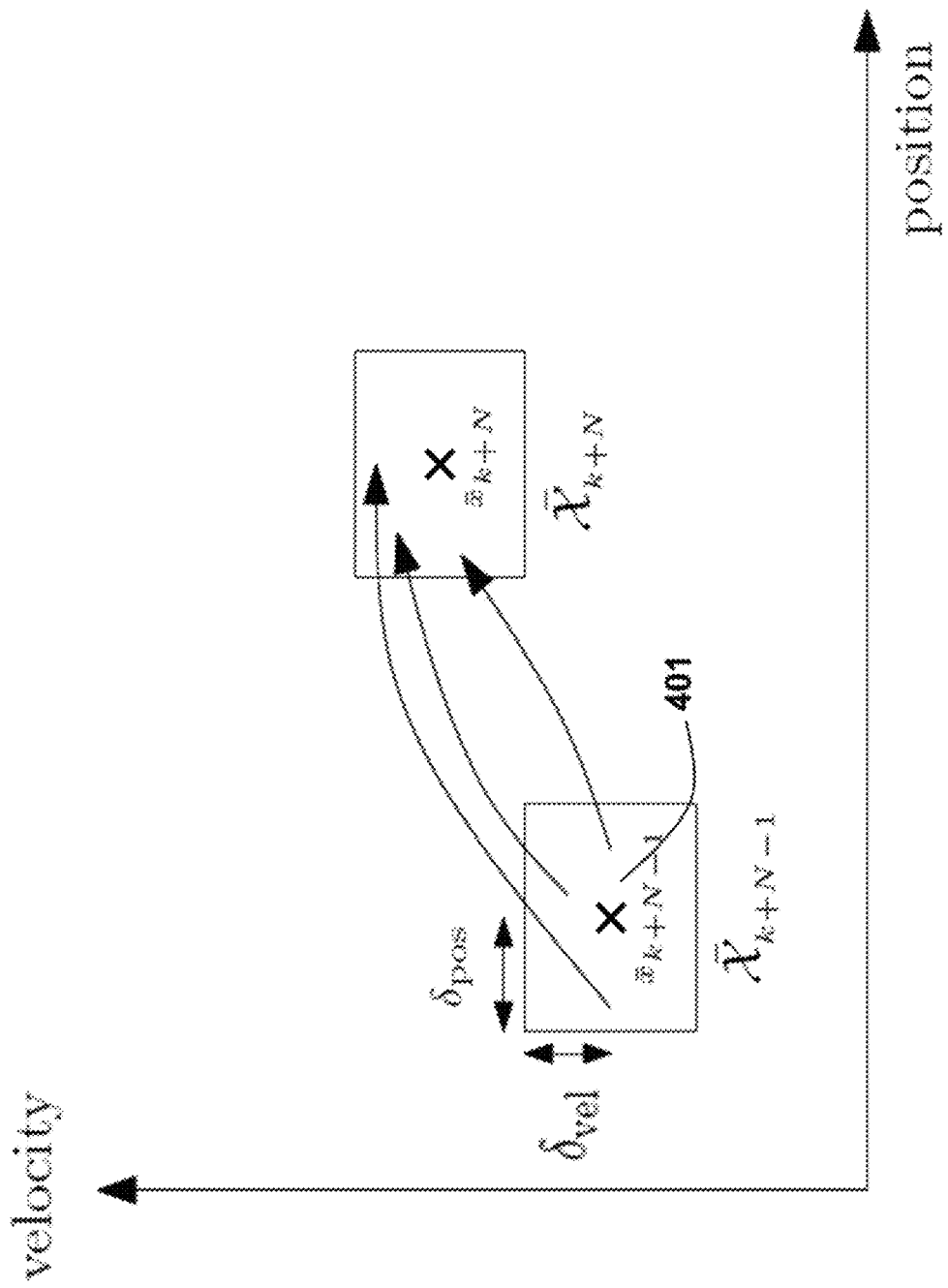
FIG. 4 is a schematic of steering the slow positioning subsystem to a next position and allowed tolerances in position and velocity according to embodiments of the invention.

For practicality purposes, the terminal equality constraint in MPC is usually implemented as a tight inequality (terminal set) constraint. This approach is understood by those skilled in the art, and is depicted in FIG. 4 where parameters $\delta_{pos}$ and $\delta_{vel}$ represent the allowed tolerances in position and velocity. Given the prespecified tolerances, $\bar{x}_{k+N-1}$ represents a set of acceptable states surrounding $\bar{x}_{k+N-1}$. The assumption that the problem was feasible at the previous time step (k+N−1) means that $$x_{k+N-1|k-1} \in \bar{X}_{k+N-1}, \quad (9)$$

where $x_{k+N-1|k-1}$ is the state prediction for the time step k+N−1 performed at the time k−1.

Hence, as shown in FIG. 4, we need to compute an admissible control input that steers the slow positioning subsystem position 401 from any position in the set $\bar{X}_{k+N-1}$ to a position in the set $\bar{X}_{k+N}$, while satisfying all state constraints. This constraint can be satisfied if and only if:

$$\text{Pre}(\bar{X}_{k+N}) \cap \bar{X}_{k+N-1} = \bar{X}_{k+N-1}, \quad (10),$$

where $\text{Pre}(\bar{X}_{k+N})$ is defined as the set of states that can be driven into the set $\bar{X}_{k+N}$ in one time step while satisfying input and state constraints.

Determining the Pre-set of a linear system is a computationally complex operation. It has been another realization of this invention that the satisfaction of the above constraint, Equation (10), can be determined by checking whether the system can be driven from all vertices of the set $\bar{X}_{k+N-1}$ to any vertex of the set $\bar{X}_{k+N}$. This can be expressed as, $$\forall x_i \in V_{\bar{x}_{k+N-1}}, \exists x_j \in V_{\bar{x}_{k+N}}, s.t.\ x_j \in Ax_i \oplus B \circ U, \quad (11)$$

where A and B are the state and control matrices representing the slow positioning subsystem dynamics, $V_{\bar{x}_{k+N}}$ is the set of vertices of $\bar{X}_{k+N}$, U is the set of admissible control inputs, and $\oplus$ is a Minkowski sum.

For each $x_i \in V_{\bar{x}_{k+N-1}}$ and $x_j \in V_{\bar{x}_{k+N}}$, the condition in equation (11) can be transformed into a set of inequalities as follows, $$\begin{bmatrix} I_{2\times 2} \\ -I_{2\times 2} \end{bmatrix} (x_j) \leq \begin{bmatrix} A(x_i) + Bu_{max} \\ -A(x_i) - Bu_{min} \end{bmatrix}, \quad (12)$$

where $u_{max}$, $u_{min}$ represent the maximal and minimal admissible inputs.

In a different embodiment of this invention, terminal equality constraint can be replaced by a terminal set constraint where an output admissible set (positive invariant set) can be used as a terminal set constraint. In this approach, an output admissible set (positive invariant set), O, is computed such that, $$\begin{bmatrix} x_{k+N|k} \\ \bar{y}_{k+N} \end{bmatrix} \in O \Rightarrow \begin{cases} x_{k+N|k} \in X \\ |y_{k+N|k} - \bar{y}_{k+N}| \leq \delta_{pas} \end{cases}, \quad (13)$$

where X is the set of admissible states, $y_{k+N-1}$ is the slow positioning subsystem position, and $\bar{y}_{k+N}$ represents the filtered reference trajectory for the slow positioning subsystem (or slow subsystem reference trajectory) (position only) at the time step k+N. Maximal positive invariant sets $O_\infty$ (the biggest invariant set that contains all possible invariant sets) can be computed by iterating over the backward reachable set computation until the sets computed in two consecutive iterations are equal. The procedure starts from a target set. The target set here is $$\Omega_0 = \{x | x \in X, |x(1) - \bar{y}| \leq \delta_{pos}\}, \quad (14)$$

where x(1) is the first element of the slow positioning subsystem state vector (position). Starting from the target set (14), the set $\Omega_{i+1}$ is calculated as $\text{Pre}(\Omega_i)$. The procedure continues until $\Omega_{i+1} = \Omega_i \Rightarrow O_\infty = \Omega_{i+1}$.

Using the invariant nature of $O_\infty$, the following set of linear inequalities can be used to verify whether the terminal constraint set can be satisfied.

$$\begin{bmatrix} x_{k+N-1|k} \\ \bar{y}_{k+N} \end{bmatrix} \in O_\infty \Rightarrow H_x x_{k+N-1|k} + H_{\bar{y}} \bar{y}_{k+N} \leq K, \quad (15)$$

where matrices $H_x$, $H_{\bar{y}}$, and K are used to represent the invariant set as a series of half spaces.

Persistent Tracking

We also realize that in order to satisfy the stroke constraints of the fast positioning subsystem, the slow positioning subsystem must move in a manner that the reference trajectory 111 is always within the stroke range of the fast positioning subsystem. We refer to this requirement as a persistent tracking requirement. To describe this condition, we assume that the terminal equality (terminal set) constraint can be satisfied for the previous and the current time steps.

Therefore, the last portion of the slow positioning subsystem trajectory is considered to be connecting position $\bar{y}_{k+N-1}$ (the filtered reference trajectory for the slow positioning subsystem (or slow subsystem reference trajectory) at the time step k+N−1) to $\bar{y}_{k+N}$ (the filtered reference trajectory for the slow positioning subsystem (or slow subsystem reference trajectory) at the time step k+N). It should be noted that the slow positioning subsystem is assumed to be moving linearly between two consecutive positions.

We realize that by using the motion of the slow positioning subsystem (between $\bar{y}_{k+N-1}$ and $\bar{y}_{k+N}$) and a limit ($d_{max,f}$) of the fast positioning subsystem stroke, an acceptable range of motion for the reference trajectory 111 can be found, where $d_{max}$ is the fast system stroke, and the subscript f represents the fast subsystem. Furthermore, we realize that due to the significant difference between the sample rates of the slow and the fast positioning subsystems, to ensure persistent tracking, the inter-sample locations of the reference trajectory 111 have to be considered. This means that the persistent tracking constraint cannot be guaranteed by checking the tracking limits only at the time steps k+N−1 and k+N.

Figure 5:
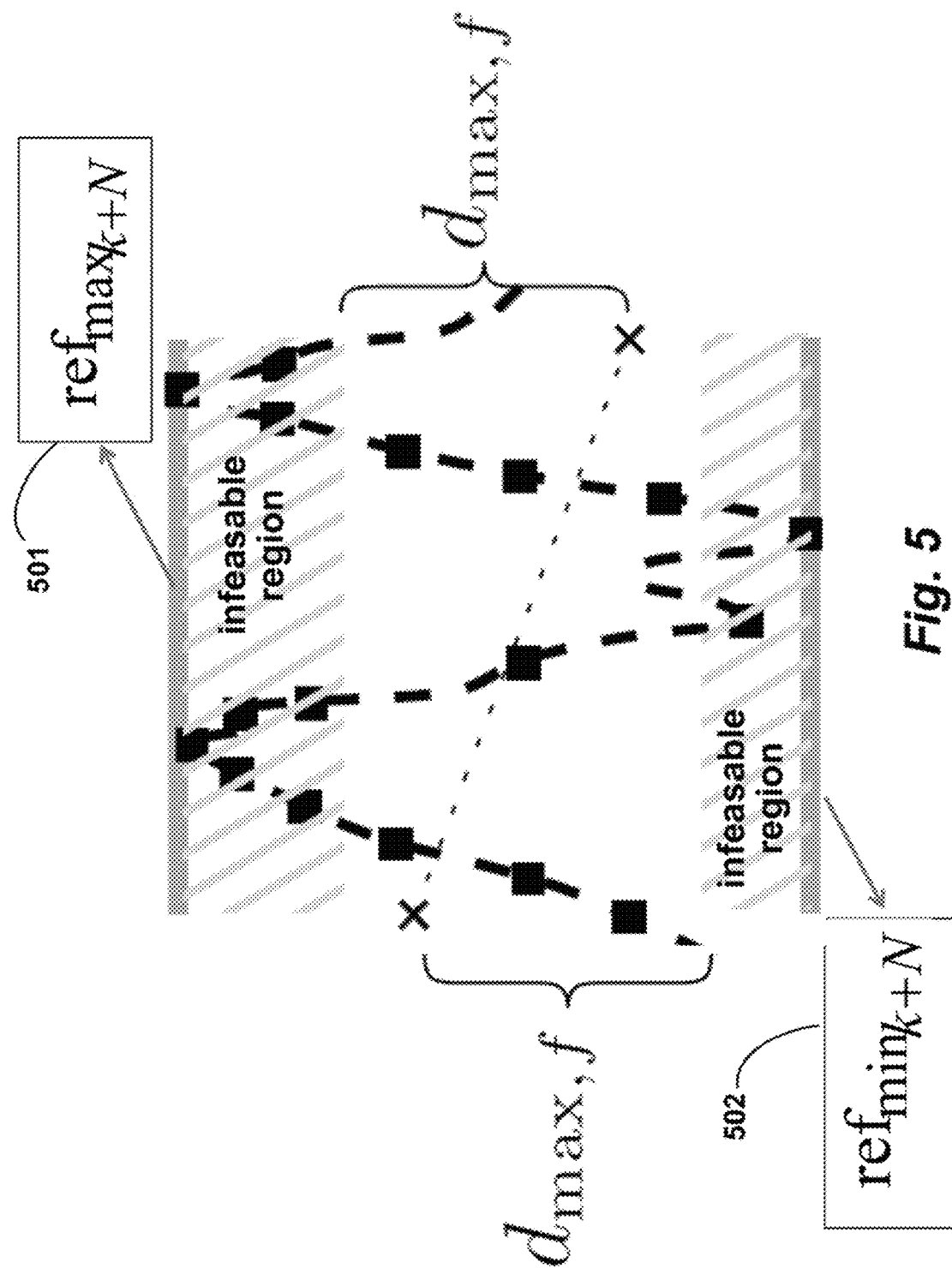
FIG. 5 is a schematic for checking for intersample tracking violations based on maximal and minimal bounds according to embodiments of the invention.

As shown in FIG. 5, our solution to efficiently check for inter-sample tracking violations is based on determining the maximal and minimal bounds for the reference trajectory 111 during each time step of the slow positioning subsystem. As shown in FIG. 5, $\text{ref}_{maxk+N}$ (501) is the maximal value of the reference trajectory 111 between time step k+N−1 and time step k+N. Similarly, $\text{ref}_{mink+N}$ (502) is the minimal value of the reference trajectory 111 between time step k+N−1 and time step k+N. Using these bounds, the persistent tracking constraint can be expressed by the following four linear inequalities $$\begin{cases} |\text{ref}_{maxk+N} - \bar{y}_{k-1+N}| \leq d_{max,f} \\ |\text{ref}_{mink+N} - \bar{y}_{k-1+N}| \leq d_{max,f} \\ |\text{ref}_{maxk+N} - \bar{y}_{k+N}| \leq d_{max,f} \\ |\text{ref}_{mink+N} - \bar{y}_{k+N}| \leq d_{max,f} \end{cases} \quad (16)$$

Considering that the terminal equality constraint in the MPC 140 is implemented as a tight inequality constraint, each inequality in equation (16) is replaced with two inequalities, where, for example, $\bar{y}_{k-1+N}$ is once replaced with $\bar{y}_{k-1+N}+\delta_{pos}$ and another time with $\bar{y}_{k-1+N}-\delta_{pos}$.

Procedure for Slowing Down the Trajectory

As described above, we provide the necessary conditions for the filtered reference trajectory 112 (or slow subsystem reference trajectory 113), and as a result, reference trajectory 111 to guarantee the future feasibility of the MPC 140. Using these constraints, we realize that by checking for possible future constraint violations, the reference trajectory 111 can be automatically modified (slowed down) to guarantee constraint satisfaction.

Figure 7:
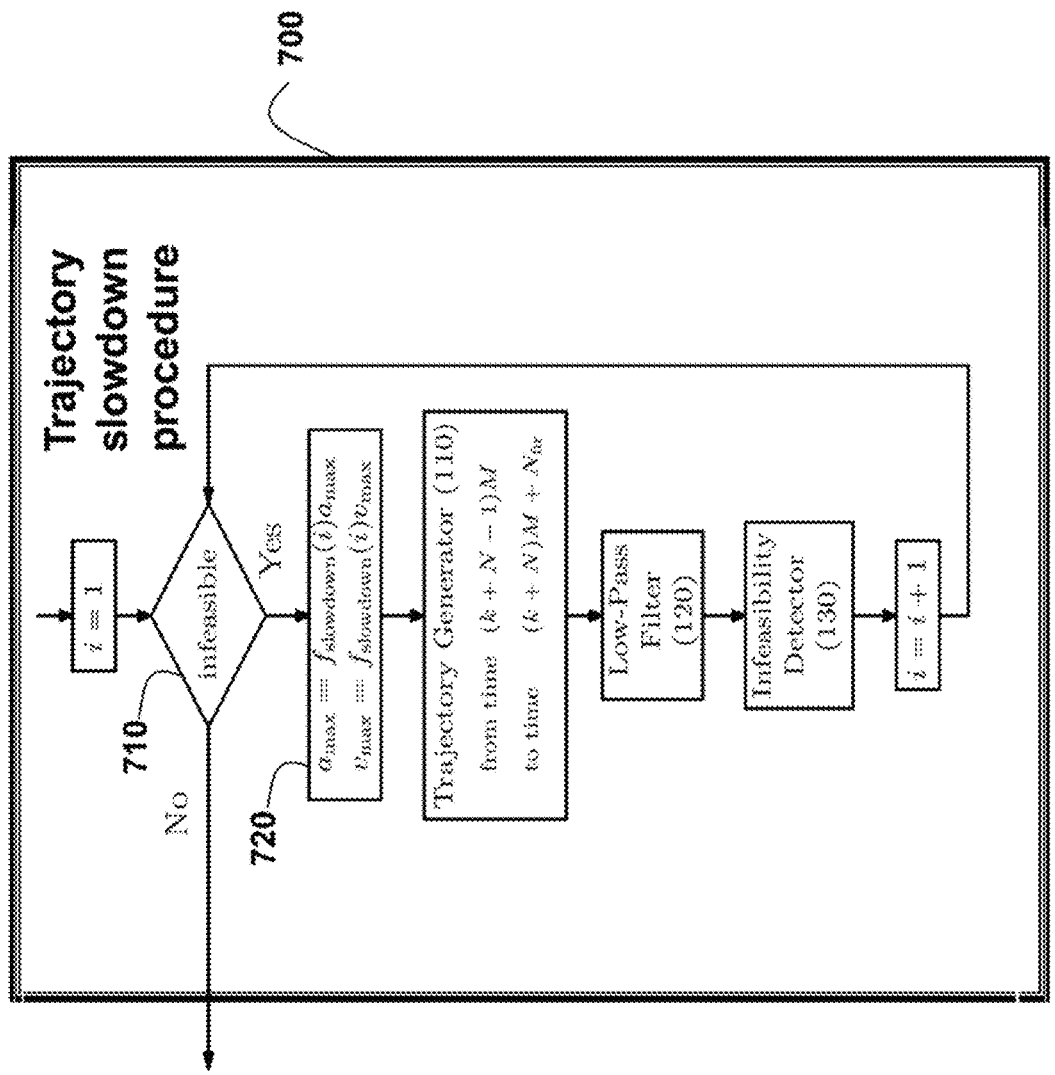
FIG. 7 is a schematic of pseudo code for trajectory slowdown according to embodiments of the invention.

FIG. 7 shows the flowchart for the trajectory slowdown block 135. The trajectory slowdown block 135 modifies the reference trajectory 111 by reducing the maximal acceleration and the maximal velocity of the laser spot. In FIG. 7, M is the ratio of fast positioning subsystem frequency to the slow positioning subsystem frequency. The procedure first checks 710 for possible infeasibilities in the newly added reference trajectory for the slow positioning subsystem 112. If infeasibility in not detected, the procedure terminates. Otherwise, the maximal acceleration and maximal velocity are reduced 720 by a slowdown factor ($f_{slowdown}$). The slowdown factor is a non-increasing function of the iteration index (i). One option is to use a constant value smaller than 1. To improve the convergence rate, variable slowdown factors can be used. One possibility is to specify the slowdown factor as a monotonically decreasing function of the iteration index (i), such as $$f_{slowdown}(i) = f_{slowdown}(1)^i, \text{ where } 0.9 \leq f_{slowdown}(1) \leq 0.95. \quad (17)$$

It is also possible to select the slowdown factor from a precalculated vector of slowdown factors.

$$f_{slowdown}(i) = \begin{cases} F_{slowdown}(i) & i \leq p \\ F_{slowdown}(p) & i > p \end{cases} \text{ where } F_{slowdown} = [f_1 \ f_2 \ \cdots \ f_p]. \quad (18)$$

Then, the trajectory generator 110 regenerates reference trajectory 111. This is followed by the optional filter 120 and infeasibility detector 130. This procedure 700 is continued until a next portion of feasible reference trajectory 111 and therefore a new filtered feasible reference trajectory for the slow positioning subsystem 112 (or slow subsystem reference trajectory 113) is generated.

Combining the description of different blocks in FIG. 1, one complete cycle of the reference generator for redundant positioning system 100 is described below. The results of steps taken during each cycle are presented in FIGS. 6A-6E.

It is worth mentioning that the sampling rate of the reference generator for redundant positioning system 100 is the same as the sampling rate of the slow-axis controller 150. In reference signal generator 100, the optional filter 120, the infeasibility detector 130, the trajectory slowdown 135, and the MPC 140 operate at the same sampling rate as the slow-axis controller 150. The trajectory generator 110, however, operates at a higher sampling rate equal to the sampling rate of the fast-axis controller 160. This results in reference trajectory 111 to have the same sampling rate as the fast-axis controller 160.

Figure 6C:
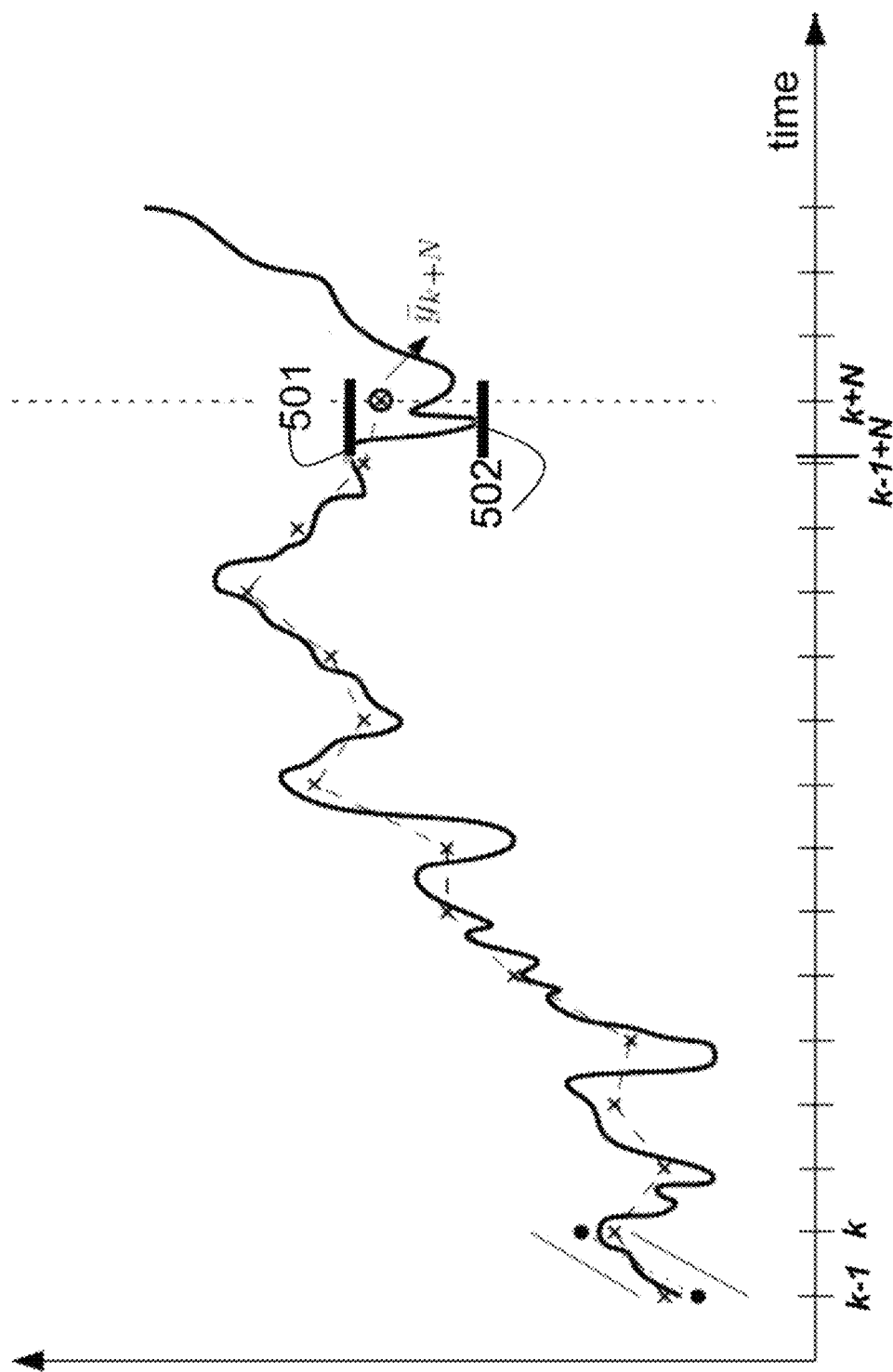
FIG. 6C is a schematic of determining a new filtered reference trajectory for the slow positioning subsystem using a filter according to embodiments of the invention.
Figure 6D:
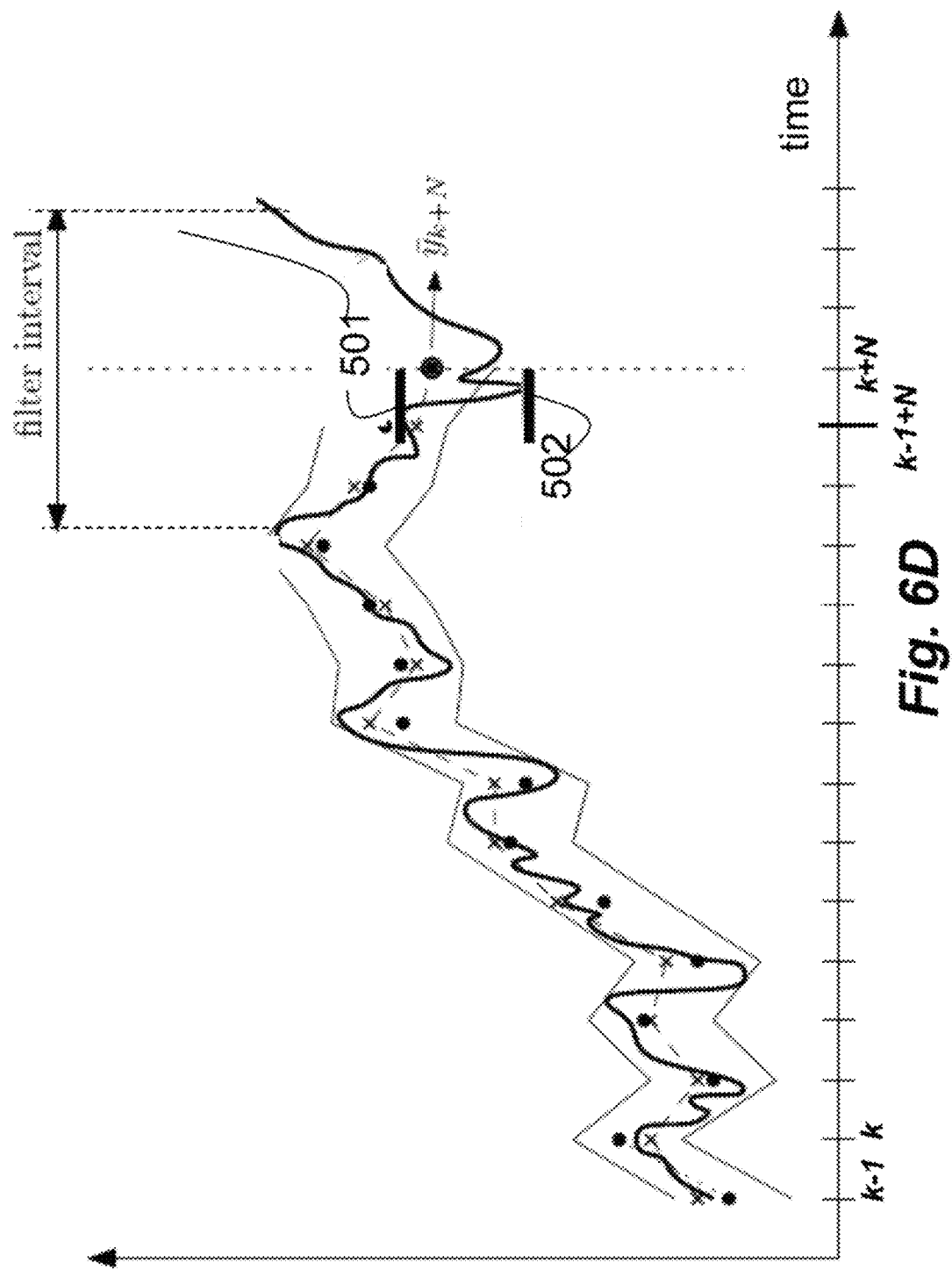
FIG. 6D is a schematic of the persistent tracking and recursive feasibility constraints for the newly added filtered reference trajectory for the slow positioning subsystem according to embodiments of the invention.
Figure 6E:
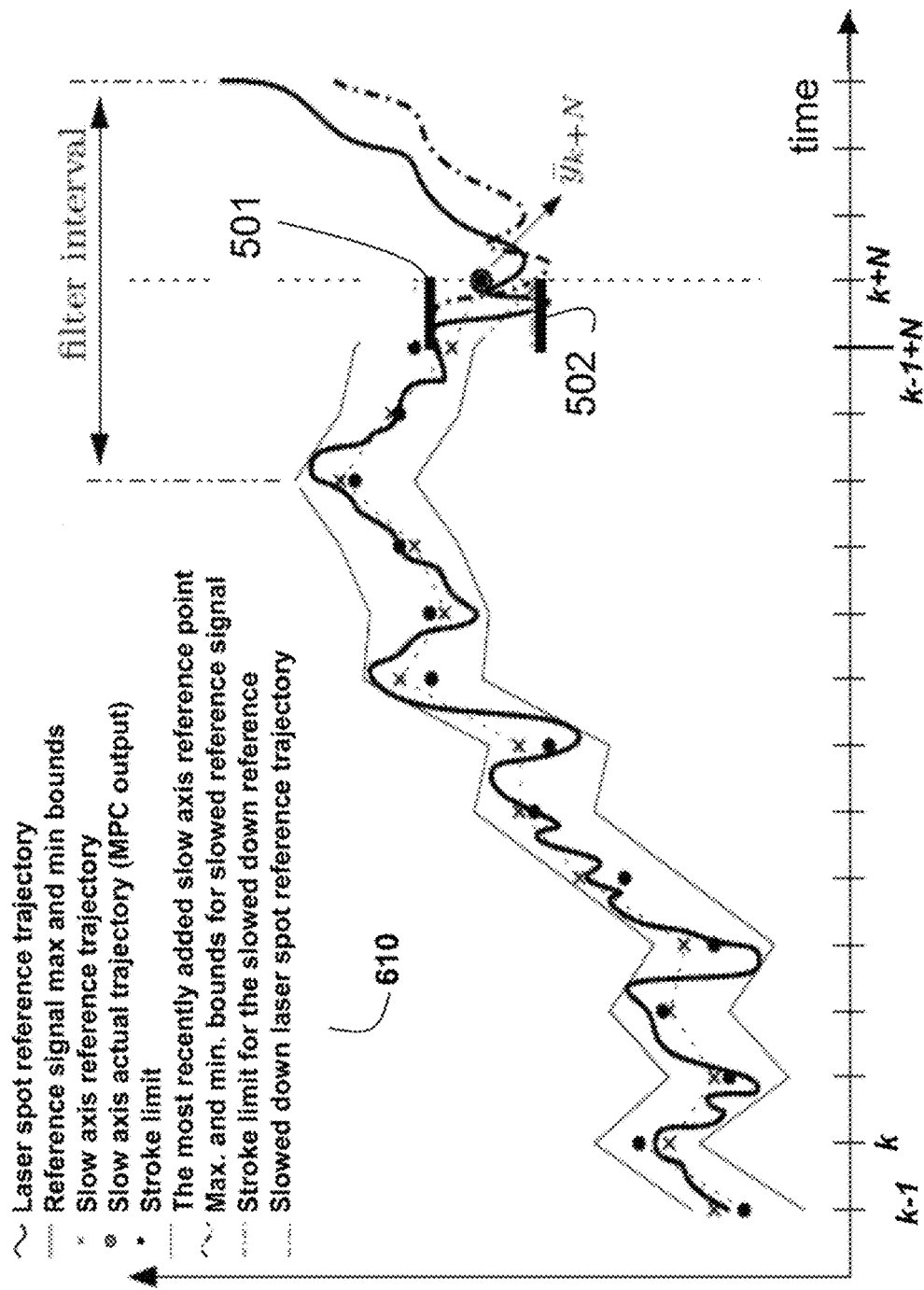
FIG. 6E is a schematic of slowing down the reference trajectory such that the persistent tracking and recursive feasibility constraints become feasible according to embodiments of the invention.

For clarity and simplicity, an inset 610 in FIG. 6E shows the meaning of all curves in FIGS. 6A-6E. For example, the bold solid line represents the reference trajectory 111, and the cross symbol represents the filtered reference trajectory 112 (or slow subsystem reference trajectory 113) for the slow positioning subsystem 102.

FIG. 6A shows the beginning of the time step k. During the previous time step (k−1), the slow positioning subsystem has moved to a next position 601.

FIG. 6B shows the next iteration is started by the trajectory generator 110 generating a next portion 602 of reference trajectory. The generated reference trajectory 602 covers one sampling period of the slow positioning subsystem from the time $(k+N-1)M+N_{fir}$ to the time $(k+N)M+N_{fir}$, wherein fir indicates the filter and $N_{fir}$ represents the filter 120 half-window. The trajectory generator 110 takes the maximal acceleration $a_{max}$ and the maximal velocity $v_{max}$ and an ordered list of positions 101 and generates the next portion 602 of the reference trajectory.

FIG. 6C shows how a next filtered reference trajectory for the slow positioning subsystem is generated. This determination is based on an averaging technique carried out by the filter 120, which is centered around the time step k+N where a new position for the slow positioning subsystem is needed. By centering the filtering (averaging) around the time step k+N, the filtered trajectory 112 or slow subsystem reference trajectory 113 for the slow positioning subsystem becomes in phase with the reference trajectory 111 (601). This, however, is not necessary and the filtering (averaging) can be performed on the reference trajectory 111 (601) prior to the time step k+N.

FIG. 6D shows the infeasibility detector 130 assessing the feasibility of the newly added reference trajectory for the slow positioning subsystem. This is performed using the set of linear inequalities, i.e., conditions expressed in equations (12) or (15), for recursive feasibility and condition (16) for persistent tracking derived for this purpose.

FIG. 6E shows how the trajectory slowdown 135 is used to recover from infeasibility by slowing down and regenerating the reference trajectory 111 (602).

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for computing a reference trajectory to position a machine that includes a slow positioning subsystem and a fast positioning subsytem, comprising the steps of:
    generating a reference trajectory according to an ordered list of points;
    producing a slow subsystem reference trajectory by either filtering the reference trajectory or chosing a value of the reference trajectory;
    determining whether the reference trajectory violates feasibility constraints by checking a recursive feasibility condition and a persistent tracking condition to determine whether the reference trajectory and the reference trajectory for the slow subsystem violate the feasibility constraints, wherein the checking for the recursive feasibility condition is performed by a forward reachability test; and if true;
    slowing down the reference trajectory and repeating the generating and determining steps; and otherwise
    sending the slow subsystem reference trajectory to the slow positioning subsystem; and
    sending a combination of the slow subsystem reference trajectory and the reference trajectory to the fast substem, wherein the steps are performed in a processor.

2. The method of claim 1, wherein the generating uses a trapezoidal profile for a velocity of sub-trajectories between two consecutive points.

3. The method of claim 2, where the trapezoidal profile is obtained by selecting an acceleration to be maximal until the velocity is within predetermined limits, then selecting an acceleration to be zero so that the velocity remains within the predetermined limits, and then selecting a deceleration to be maximal until the velocity is zero.

4. The method of claim 1, wherein the slow subsystem reference trajectory is generated using a filter.

5. The method of claim 4, wherein the filter is a zero phase finite impulse response filter, a zero phase infinite impulse response filter, or a low pass filter.

6. The method of claim 1, wherein the checking for the recursive feasibility condition is performed by verifying whether a state of the slow positioning system belongs to a maximal output admissible set.

7. The method of claim 1, wherein the forward reachability test is performed by verifying satisfaction of a set of linear inequalities.

8. The method of claim 6, wherein the forward reachability test is performed by verifying satisfaction of a set of linear inequalities.

9. The method of claim 1, wherein the checking for the persistent tracking is performed by checking whether minimal and maximal reference bounds are at a distance lesser than a stroke of the fast positioning subsystem from initial and final points of a current position of the slow positioning subsystem.

10. The method of claim 9, wherein the checking is performed by verifying satisfaction of linear inequalities involving maximal and minimal bounds, current and future terminal positions of the slow positioning subsystem and a stroke of the fast positioning subsystem.

11. The method of claim 1, wherein the slowing down reduces a maximal acceleration and a maximal velocity of the reference trajectory.

12. The method of claim 11, wherein the repeating maintains an iteration index, and a slowdown factor is a non-increasing function of the iteration index.

13. The method of claim 1, wherein the fast positioning subsystem always follows, within an error tolerance, a difference between the reference trajectory and the slow subsystem reference trajectory.

14. The method of claim 1, wherein the slow subsystem reference trajector is sent to the slow positioning subsystem via a model predictive control (MPC) module.

15. The method of claim 1, wherein the machine operates continuously while satisfying the feasibility constraints.

16. The method of claim 1, wherein the machine is a laser drilling system.

17. The method of claim 1, wherein the machine is a laser cutting system.

18. The method of claim 1, wherein the machine is a laser marking system.

19. The method of claim 1, wherein the machine is a scribing system.

20. The method of claim 1, wherein the machine is a laser direct imaging system.

21. The method of claim 1, wherein the machine is an electron beam processing machine.

22. A method for computing a reference trajectory to position a machine that includes a slow positioning subsystem and a fast positioning subsytem, comprising the steps of:
  generating a reference trajectory according to an ordered list of points;
  producing a slow subsystem reference trajectory by either filtering the reference trajectory or chosing a value of the reference trajectory;
  determining whether the reference trajectory violates feasibility constraints; and if true;
  slowing down the reference trajectory and repeating the generating and determining, wherein the slowing down reduces a maximal acceleration and a maximal velocity of the reference trajectory, and wherein the repeating maintains an iteration index, and a slowdown factor is a non-increasing function of the iteration index; and otherwise
  sending the slow subsystem reference trajectory to the slow positioning subsystem; and
  sending a combination of the slow subsystem reference trajectory and the reference trajectory to the fast substem, wherein the steps are performed in a processor.

* * * * *